(Model.)
H. B. RORKE.
Attachment for Wash Boilers.
No. 236,362.                               Patented Jan. 4, 1881.
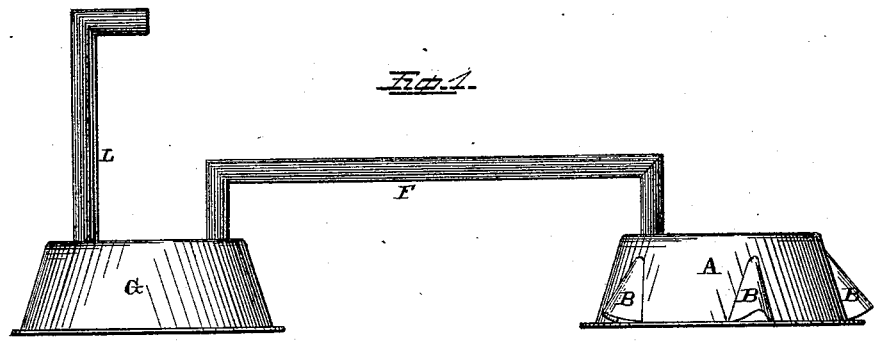
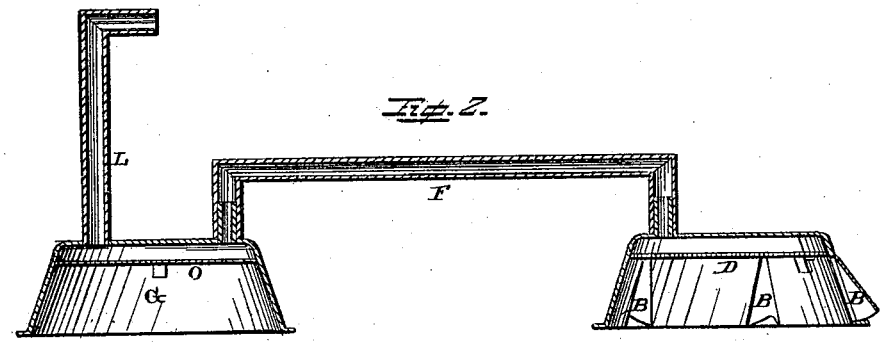
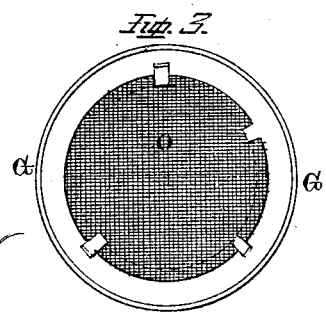
Witnesses
Wm. W. Mortimer
Chas. S. Jones
Inventor
H. B. Rorke,
per
F. A. Lehmann,
Atty

UNITED STATES PATENT OFFICE.

HUGH B. RORKE, OF FULTON, NEW YORK.

ATTACHMENT FOR WASH-BOILERS.

SPECIFICATION forming part of Letters Patent No. 236,362, dated January 4, 1881.

Application filed October 14, 1880. (Model.)

*To all whom it may concern:*

Be it known that I, H. B. RORKE, of Fulton, in the county of Oswego and State of New York, have invented certain new and useful Improvements in Attachments for Wash-Boilers; and I do hereby declare the following to be a full, clear, and exact description of the invention, such as will enable others skilled in the art to which it pertains to make and use it, reference being had to the accompanying drawings, which form part of this specification.

My invention relates to an improvement in attachments for wash-boilers; and it consists in the combination of two separate and distinct vessels, which are placed in the bottom of the boiler and connected together by means of a pipe, through which the water passes from the one into the other, and which vessels are provided with strainers for the purpose of preventing the sediment in the water from being carried up through the clothes, as will be more fully described hereinafter.

The object of my invention is to place two separate and distinct vessels in the bottom of the boiler, into the first one of which water passes through suitable openings in its sides, and in which vessels the water is heated, and is then forced by means of the heat over into the other vessel, and then forced up over the clothes, each one of the vessels being provided with a strainer, which catches a large portion of the sediment or dirt which is washed out of the clothes and prevents it from being carried up with the water and again discharged over the clothes.

Figure 1 represents a side elevation of my invention. Fig. 2 represents a vertical section of the same. Fig. 3 is an inverted view of the vessel G.

A represents a vessel of any desired shape or size, which is placed upon the bottom of the wash-boiler, and which vessel has a number of openings, B, made around its sides, so that the water can freely pass therein. These openings are covered over, as shown, and the water passes into the vessel from contact with the bottom of the boiler itself. As the water is rising upward it is caught by the inclined covers of the holes B and guided into the vessel, where it is held long enough to become heated and to be forced by the heat up through the screen D, that is placed near the top of the vessel, and on through the pipe F into the vessel G beyond. This screen in the vessel A serves to catch the greater portion of the dirt or sediment which has been washed from the clothes, and thus separates it from the water, so that it will not be carried back and forth by the water in the usual manner. This screen is made readily removable from the vessel A, so that it can be thoroughly cleansed at any time after having been used. The water that is forced by the heat from the vessel A through the connecting-pipe F is discharged into the top of the vessel G, which is of similar shape and size to the one A, and which is placed in the other end of the boiler, in direct contact with the bottom thereof. The water which has been forced into the vessel G through the pipe F, and that which is in the bottom of the vessel, and which has become heated by contact with the bottom of the boiler, rises up through the screen O placed therein, and passes up through the vertical pipe L, and is discharged upon the top of the clothes. The screen O serves to arrest all or a large portion of the sediment in the water, which rises upward from the action of the heat from the lower part of the vessel G. As this vessel is open at its bottom, some water will always be passing in under its lower edges, and thus a constant upward current will be formed through the vessel G, but not as large a one as passes through the vessel A.

Where the screens are not used as here shown the sediment and dirt that are washed out of the clothes are constantly carried back and forth through them, and the consequence is that a much greater amount of rubbing and washing is necessary to cleanse them.

Having thus described my invention, I claim—

An attachment for wash-boilers, consisting of the combination of the two vessels A G, connected together by the pipe F, the two screens D O, and the pipe L, for carrying the water up over the clothes, both of the vessels being open at their bottoms, substantially as shown and described.

In testimony that I claim the foregoing I have hereunto set my hand this 2d day of October, 1880.

HUGH B. RORKE.

Witnesses:
B. J. KIMBALL,
J. D. SPENCER.